United States Patent
Kavasseri et al.

(10) Patent No.: US 7,287,069 B1
(45) Date of Patent: Oct. 23, 2007

(54) USING CONTEXT-SENSITIVE INTELLIGENT DIFFS TO MODIFY ROUTER CONFIGURATIONS

(75) Inventors: Ramanathan Kavasseri, Fremont, CA (US); Sankha Basu, Calcutta (IN); Praveen Joshi, Sunnyvale, CA (US); Shankar Natarajan, Fremont, CA (US); John Lautmann, Fremont, CA (US); Richard Pratt, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 907 days.

(21) Appl. No.: 10/322,850

(22) Filed: Dec. 18, 2002

(51) Int. Cl.
*G06F 15/177* (2006.01)

(52) U.S. Cl. .................. 709/221; 709/228; 709/242; 370/328; 370/338; 370/401; 370/465

(58) Field of Classification Search .................. None
See application file for complete search history.

(56) References Cited

U.S. PATENT DOCUMENTS

| | | | |
|---|---|---|---|
| 6,415,372 B1* | 7/2002 | Zakai et al. | 711/165 |
| 6,823,376 B1* | 11/2004 | George et al. | 709/221 |
| 6,990,656 B2* | 1/2006 | Ersek et al. | 717/121 |
| 6,996,818 B2* | 2/2006 | Jacobi et al. | 717/170 |
| 7,035,878 B1* | 4/2006 | Multer et al. | 707/201 |
| 7,080,279 B2* | 7/2006 | Asare et al. | 714/13 |
| 2003/0140132 A1* | 7/2003 | Champagne et al. | 709/223 |
| 2003/0149756 A1* | 8/2003 | Grieve et al. | 709/223 |
| 2004/0032837 A1* | 2/2004 | Visser | 370/254 |
| 2004/0139179 A1* | 7/2004 | Beyda | 709/221 |

OTHER PUBLICATIONS

Malis et al., "Multiprotocol Interconnect on X.25 and ISDN in the Packet Mode," RFC: 1356, 18 Pages, 1992.

* cited by examiner

*Primary Examiner*—Bunjoe Jaroenchonwant
*Assistant Examiner*—Van Kim T. Nguyen
(74) *Attorney, Agent, or Firm*—Beyer Weaver LLP

(57) ABSTRACT

Methods and devices are disclosed for changing the configuration state of a network device such as a router, a switch or a similar device without the need for a person to interpret a textual diff. According to some aspects of the invention, a programmatic diff file that includes the output of two comparisons is used as an input file to a program that "rolls back" the current configuration state to a prior configuration state. According to other aspects of the invention, the output of a single comparison is input to an "incremental diff" process, which adds new commands to a configuration state. According to preferred aspects of the invention, the output files generated by the comparison processes preserve the hierarchical context of each command in a programmatic format that is usable as direct input by the network device or by another device (such as a host controlled by a network administrator) that performs the incremental diff.

38 Claims, 16 Drawing Sheets

USING CONTEXT-SENSITIVE INTELLIGENT DIFFS TO MODIFY ROUTER CONFIGURATIONS

BACKGROUND OF THE INVENTION

1. Field of the Invention

The present invention generally relates to data networks. More specifically, the invention relates to modifying the configuration states of routers, switches and other network devices in such data networks.

2. Description of Related Art

For devices such as routers and switches, a configuration state may be represented as a text file known as a "configuration file." Configuration files may reflect the various hierarchical contexts, such as "modes," "submodes," etc., that a router or switch can present. Each context has a specific set of pre-defined commands. Defined commands are valid only within the appropriate hierarchical context, e.g., within a particular mode or submode. Accordingly, such commands are context-specific.

For example, in software developed by Cisco Systems, Inc., there are two top-level modes for routers: "Exec" mode and "Config" mode. Within the configuration mode, there are several defined submodes, which may include sub-submodes, sub-sub-submodes, and so on. For the sake of brevity, all such hierarchical contexts will be referred to herein as "submodes."

Within each submode there are a number of different commands. Commands within Exec mode are not part of the configuration state of a router. Exemplary commands within Exec mode include "show," "copy" and "debug." Commands in Config mode constitute the configuration state of a router. Examples include commands to set up ip access lists, hostname, interfaces, etc.

Centralized network management involves configuring, provisioning and managing network elements. A central management application or operator gathers data from network elements in order to derive information to perform these tasks and then downloads configuration commands to one or many network elements to dynamically control the network. Control of the network involves sending one or more commands to network elements. For each command within a set of commands, it is essential that the associated mode or submode be specified so that the command can be applied in the right context. The optimal way of applying a set of configuration changes is by only applying an incremental set of changes, the incremental set being determined for a defined control or measurement interval. Because optimal application is critical in device configuration, it is important to determine the changes or "diffs" between a device's configuration state over a control or measurement interval, e.g. at a first time and at a second time.

With standard and widely used general-purpose diff algorithms, a purely textual diff is generated when two configuration states are compared. Textual diffs have limited utility because the context in which a certain command applies is not carried over. For instance, suppose that the textual diff between two router configurations is "+ ip address 1.1.1.1 255.255.255.0." If the router has 5 different interfaces, the association of this ip address command with a particular interface is unclear. The only "context" provided by such general-purpose algorithms is optionally to include a specific number of lines above and/or below the textual diff. Because submodes have varying and unpredictable numbers of commands, the resulting textual diff may or may not include the proper submode for the changed, new or missing command. In addition, such algorithms may result in inclusion of lines that have not changed.

The ambiguity of such general-purpose textual diffs does not permit accurate application of commands for controlling a network. Moreover, purely textual diffs are not "programmatic," in that they cannot be used as a direct input for a machine-level interface without a need to re-parse generated text. Therefore, conventional textual diffs cannot be reliably used as input to an automated process such as a computer program for automatically changing the configuration state of a network device.

SUMMARY OF THE INVENTION

Methods and devices are disclosed for changing the configuration state of a network device such as a router, a switch or a similar device without the need for a person to interpret a textual diff. According to some aspects of the invention, a programmatic diff file that includes the output of two comparisons is used as an input file to a program that "rolls back" the current configuration state to a prior configuration state. One comparison is a "negative pass," wherein the configuration state of a device at a second time is compared to the configuration state of the device at a first time. The negative pass identifies configuration lines that have been added to the configuration state by the second time. The other comparison is a "positive pass," wherein the configuration state of a device at the first time (which may be a startup configuration) is compared to a configuration state of the device at the second time. The positive pass identifies configuration lines that were present at the first time, but have been removed from the configuration state at the second time.

According to other aspects of the invention, the output of a single "positive pass" is input to an "incremental diff" process, which adds new commands to a configuration state. According to preferred aspects of the invention, the output files generated by the comparison processes preserve the hierarchical context of each command in a programmatic format that is usable as direct input by the network device or by another device (such as a host controlled by a network administrator) that performs the incremental diff.

According to some aspects of the invention, a method is provided for modifying a second configuration state of a network device based on a first configuration state of the network device. The method includes: inputting a programmatic diff file produced by comparing a second configuration file representing the second configuration state of the network device to a first configuration file representing the first configuration state of a network device; and executing a computer-implemented procedure for modifying the second configuration state based upon commands in the programmatic diff file.

The programmatic diff file may include a plurality of commands in a hierarchical context. The first configuration file may include a startup configuration file. The second configuration file may include a running configuration file. The programmatic diff file may include one or more commands that are in the first configuration file but not in the second configuration file. The executing step can include modifying the second configuration state by adding commands to the second configuration state in positions defined by the hierarchical context. The hierarchical context may be characterized by a plurality of submode levels.

According to other aspects of the invention, a method is provided for comparing a first configuration file, representing a first configuration state of a network device, to a second configuration file, representing a second configuration state of a network device, and for modifying the second configuration state based on the first configuration state, each configuration file comprising a plurality of commands in a hierarchy characterized by a plurality of submode levels. The method includes: determining a first hierarchical context of the first commands; searching within a second hierarchical context in the second configuration file for second commands that match the first commands, wherein the second hierarchical context corresponds to the first hierarchical context; saving missing commands for which no match is found in the searching step and the first hierarchical context for the first missing commands; and adding the missing commands to the second configuration state in positions defined by the first hierarchical context.

The determining step may include determining a number of spaces preceding a first command. The first configuration file may be a startup configuration file. The searching step may include searching only within the second hierarchical context. The searching step may involve determining a number of spaces preceding a second command. The searching step may begin a search after a position of a second command that matched a first command. The first hierarchical context of a missing command may include a first command at a higher hierarchical level than the first missing command.

Alternative aspects of the invention provide a computer-implemented method for comparing a first configuration file, representing a first configuration state of a network device, to a second configuration file, representing a second configuration state of a network device, and for modifying the second configuration state based on the first configuration state, each configuration file comprising a plurality of commands in a hierarchy characterized by a plurality of submode levels. The method includes: comparing each command in the first configuration file with a subset of the commands in the second configuration file while simultaneously tracking a hierarchical context for the command in the first configuration file, the hierarchical context being based upon a command's submode level in the hierarchy, wherein the subset of the commands in the second configuration file to which each command in the first configuration file is compared is determined with reference to the hierarchical context; saving missing commands for which no match is found in the comparing step and the hierarchical context for the missing commands; and adding the missing commands to the second configuration state in positions defined by the hierarchical context.

Yet other aspects of the invention provide a method of rolling back a second configuration state of a network device to a first configuration state of the network device, the second configuration state being represented by second commands of a second configuration file and the first configuration state being represented by first commands of a first configuration file. The method includes: inputting a programmatic diff file produced by comparing a second configuration file representing the second configuration state of the network device to a first configuration file representing the first configuration state of a network device; and executing a computer-implemented procedure for conforming the second configuration state to the first configuration state based upon commands in the programmatic diff file.

The programmatic diff file may include a plurality of commands in a hierarchical context. The first configuration file may include a startup configuration file. The second configuration file may include a running configuration file. The programmatic diff file may include one or more commands that are in the first configuration file but not in the second configuration file. The executing step may include adding commands to the second configuration state in positions defined by the hierarchical context. The executing step may include deleting commands from the second configuration state in positions defined by the hierarchical context. The hierarchical context can be characterized by a plurality of submode levels.

Alternate aspects of the invention provide a method of rolling back a second configuration state of a network device to a first configuration state of the network device, the second configuration state being represented by second commands of a second configuration file and the first configuration state being represented by first commands of a first configuration file. The method includes the steps of determining a second hierarchical context of the second commands; searching within a first hierarchical context in the first configuration file for first commands that match the second commands, wherein the first hierarchical context corresponds to the second hierarchical context; saving second missing commands for which no match is found in the first configuration file and the second hierarchical context for the second missing commands; searching within the second hierarchical context of the second configuration file for second commands that match the first commands; saving first missing commands for which no match is found in the second configuration file and the first hierarchical context for the first missing commands; deleting the second missing commands from the second configuration state; and adding the first missing commands to the second configuration state in positions defined by their first hierarchical context.

The determining step may involve determining a number of spaces preceding a command. The first configuration file may be a startup configuration file. The searching steps may involve determining a number of spaces preceding a command. The searching steps may begin a search after a position of a command that matched a preceding command. The first hierarchical context may include a first command at a higher hierarchical level than the first missing command.

All of the foregoing methods may be implemented in a computer program embodied in a computer-readable medium which causes a computing device (such as a network device, a host device, etc.) to perform the foregoing steps. Some embodiments of the present invention include an apparatus that is configured to perform steps of one or more of the foregoing methods.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
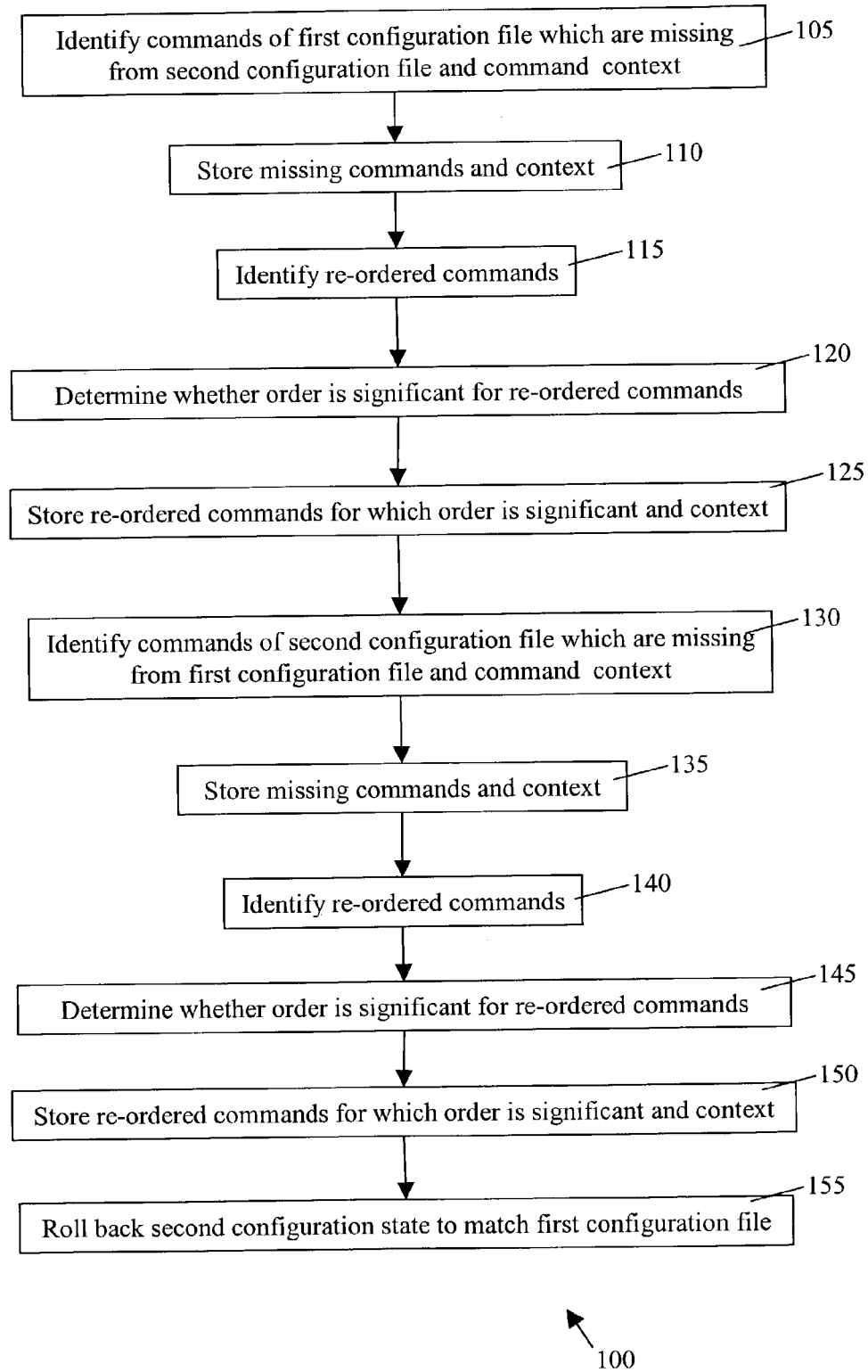
FIG. 1 is a flow chart that outlines some general aspects of the invention.

FIG. 1 is a flow chart that outlines some high-level aspects of method 100 for performing "diff" and "rollback" operations according to some aspects of the present invention. The steps of method 100 will be described in a particular sequence, but need not be performed in that sequence.

In step 105, commands of a first configuration file are compared to commands of a second configuration file. The first configuration file may represent the configuration state of a network device at a first time and the second configuration file may represent the configuration state of the network device at a second time. Commands of the first configuration file that are not present in the second configuration file are identified. The context of these commands is also identified. Generally speaking, "context" or "hierarchical context" as used herein means the position of the command within a hierarchy (e.g., the command's submode level) and/or the command's association with other commands. According to some aspects of method 100, the context of a command is identified by indicating all higher-level commands in the same submode within which the command is located.

In step 110, missing commands are stored, along with their context information. In step 115, "re-ordered" commands are identified that exist in both the first configuration file and the second configuration file, but which are in a different position in the second configuration file. Some commands, such as access-list commands, boot commands, etc., are "order-sensitive," meaning that the commands may produce different results if they are performed in different sequences. Accordingly, in step 120, a determination is made as to whether the re-ordered commands (if any) are order-sensitive. Commands that are both re-ordered and order-sensitive are stored in step 125.

Steps 130 through 150 are mirror images of steps 105 through 125. In step 130, commands of the second configuration file are compared to commands of the first configuration file. Commands of the second configuration file that are not present in the first configuration file are identified. The context of these commands is also identified. In step 135, missing commands are stored, along with their context information.

In step 140, "re-ordered" commands are identified that exist in both the second configuration file and the first configuration file, but which are in a different position in the first configuration file as compared to the second configuration file. In step 145, a determination is made as to whether the re-ordered commands (if any) are order-sensitive. Commands that are both re-ordered and order-sensitive are stored in step 150.

In step 155, the stored commands (referred to herein as intelligent configuration diffs or ICDs) are provided to rollback software and/or hardware that re-configure the second configuration state to match the first configuration file. This "rollback" process will be described in more detail below. Broadly speaking, the process involves deleting commands that have been added since the first configuration state and adding commands that have been deleted since the first configuration state, preferably in that order.

Figure 2:
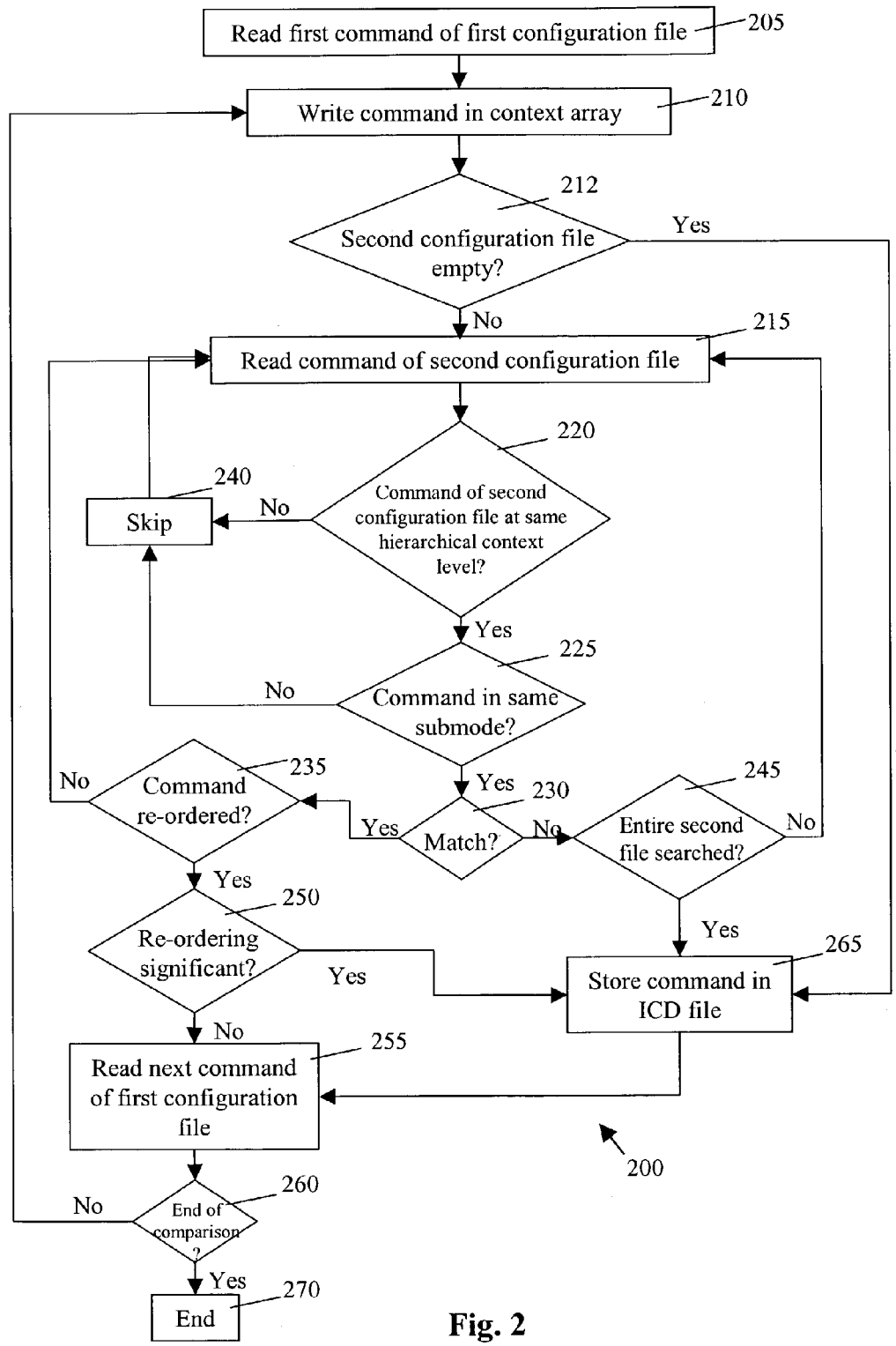
FIG. 2 is a flow chart that outlines a process of comparing a first configuration file to a second configuration file.

FIG. 2 is a flow chart that depicts the steps of method 200 according to some aspects of this invention. The steps of method 200 provide more detail regarding steps 105 through 125 according to some aspects of method 100. Once again, the steps of method 200 may be performed in an order different from that depicted in FIG. 2 and described below. Moreover, some steps described below may be omitted and/or other steps may be added.

In step 205, a first command of a first configuration file is read. Preferably, the hierarchical context (e.g., the submode level) of the first command is determined. The configuration file could be, for example, a startup configuration file or a prior running configuration file of a network device. In step 210, the first command is written to a file, which is referred to as a "context array" in this example. More details about such files will be explained below with reference to FIG. 3.

In step 212, it is determined whether a second configuration file has commands or whether the second configuration file is empty. If the second configuration file is empty, the process continues to step 265, wherein the command from the first configuration file is stored in a file. If the second configuration file is not empty, the process continues to step 215.

In step 215, a command of the second configuration file is read and its hierarchical context is determined. The second configuration file could be, for example, a running configuration file of the network device. In step 220, it is determined whether the hierarchical context of the first command is the same as the hierarchical context of the second command. According to some aspects of method 200, the number of spaces preceding the first command is compared to the number of spaces preceding the second command. If the number of spaces is the same, the second command is determined to be at the same level in the command hierarchy, e.g., at the same submode level. If so, the method optionally proceeds to step 225, wherein it is determined whether the second command is actually in the same submode as the first command. If not, the process proceeds to step 240, the second command is skipped, and another command is read from the second configuration file.

Checking initial spaces is merely one exemplary form of level determination. Some configuration files represent levels using indicators other than initial spaces (e.g., tabs, XML tags, etc.) Therefore, alternative aspects of the present invention use alternate methods of level determination. Accordingly, step 220 may involve the evaluation of tabs, XML tags, etc., to determine the hierarchical context of a command.

In step 230, it is determined whether the first command matches the second command. If the commands do not match, it is determined whether the entire second configuration file has been searched. If so, the command is stored in an ICD file in step 265. If not, the process returns to step 215 and another command is read from the second configuration file.1

If the commands match, it is determined in step 235 whether the first command is in the same relative position in the first configuration file as compared to the position of the second command in the second configuration file. If not, the process returns to step 215. If so, it is determined in step 250 whether the re-ordering is significant. If so, the command is stored in an ICD file. If not, the method seeks to read the next line of the first configuration file in step 255.

In step 260, it is determined whether the comparison process is complete. If all of the commands of the first configuration file have already been read, it is determined that the comparison process is complete and method 200 ends in step 270. If all of the commands of the first configuration file have not already been read, the process returns to step 110 and the next command of the first configuration file is written in the context array. Method 200 continues until all commands of the first configuration file have been evaluated.

The output produced by method 200 may be used in a variety of ways. According to some aspects of the present invention, the output is provided to an "incremental diff" algorithm embodied in hardware and/or software. The incremental diff algorithm may optionally add the commands in the ICD file to the second configuration file in their proper context, as set forth in more detail below. According to other aspects of the present invention, the output is provided to a "diff" algorithm to complete a process similar to that of method 100.

Figure 3:
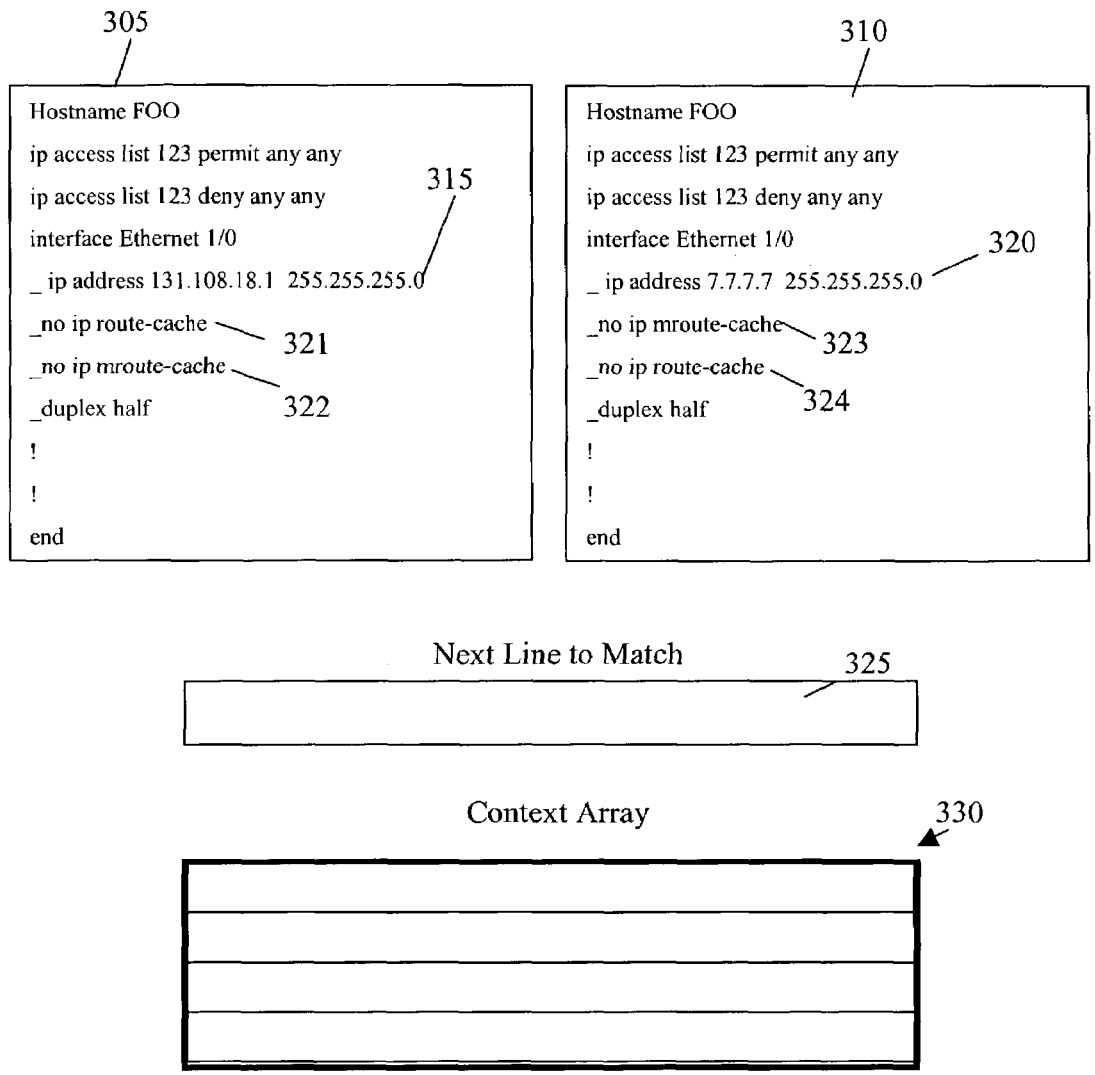
FIG. 3 illustrates two exemplary configuration files.

Some aspects of the present invention will be described in further detail with reference to FIGS. 3 through 13. FIG. 3 illustrates simplified configuration files 305 and 310, which will be compared to produce an ICD. In this example, file 305 is a modified file and file 310 is an original file. In this example, files 305 and 310 contain identical commands, except that line 315 of file 305 does not match line 320 of file 310. However, lines 321 and 322 of file 305 are in a different sequence as compared to corresponding lines 323 and 324 of file 310. According to some aspects of the invention, file 310 is a startup configuration file, which specifies an initial configuration state of a router and file 305 is a running configuration file, which indicates a current configuration state of a router.

In one phase of this method, a computer program searches configuration file 310 and attempts to find a copy of each command in configuration file 305. The result of this phase, sometimes referred to as a "negative pass," is to identify commands which exist in file 305 but which do not exist in file 310. In another phase of this method, a computer program searches configuration file 305 and attempts to find a copy of each command in configuration file 310. The result of this phase, sometimes referred to as a "positive pass," is to identify commands which exist in file 310 but which do not exist in file 305.

Performing a positive pass alone will provide the necessary output for applications such as incremental diff algorithms, as noted above. However, other applications (e.g., "rollback" to a previous configuration state) require output from a negative and a positive pass.

The sign convention for these passes arose in the context of configuration rollback. When attempting to roll back a current configuration state to an initial configuration state, a negative pass identifies commands that have been added since the original configuration state. These commands would, therefore, need to be deleted from the current configuration state in order to return a router to the original configuration state. When attempting to roll back a current configuration state to an initial configuration state, a positive pass identifies commands that have been deleted since the first configuration state. These commands would need to be added to the current configuration state in order to return a router to the original configuration state. According to some such embodiments, the negative pass is preferably performed before the positive pass. According to some such embodiments, the current configuration state can be represented as a running configuration file.

The method according to this aspect of the invention does not attempt to match lines of a configuration file that are not command lines. For example, comment lines (which begin with an exclamation point) are skipped. According to other aspects of the invention each line may be evaluated, but skipping lines that are not command lines is more efficient.

First, a negative pass will be described with reference to FIGS. 3 through 12. Field 325 is a variable that indicates the "next line to match." For a negative pass, the next line to match is a command in file 305 for which the program is currently attempting to find a match in file 310. Context array 330 will indicate the context within which a particular command has been found, as discussed in detail in the following paragraphs. Field 325 and context array 330 are stored in memory, e.g., in memory buffers.

Figure 4:
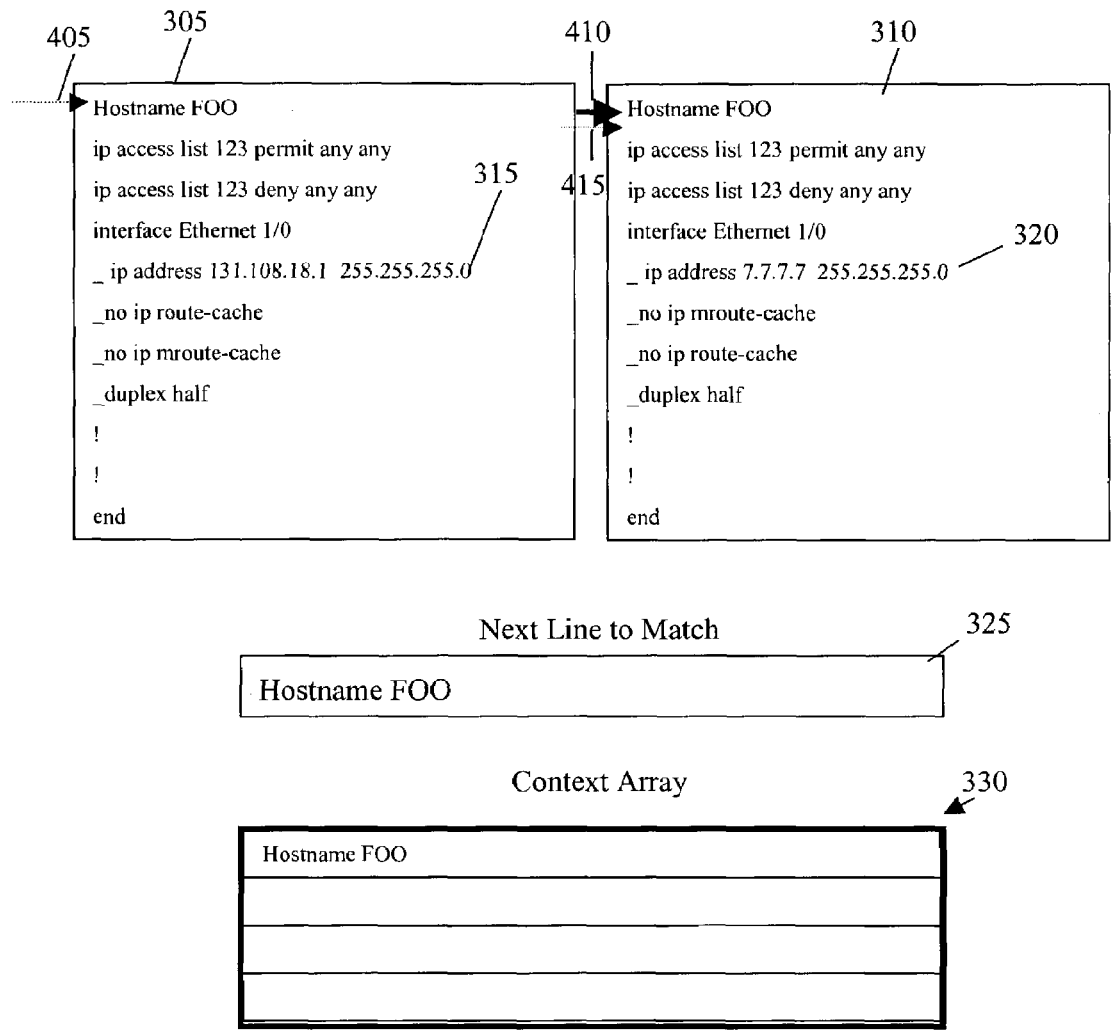
FIG. 4 illustrates two exemplary configuration files and a context array at a first time during a comparison of a first configuration file to a second configuration file.

FIG. 4 illustrates the first steps of a negative pass according to some aspects of this method. Here, the first command line of file 305, "Hostname FOO," is written in field 325. Pointer 405 indicates the line of file 305 (in this instance, "Hostname FOO"), for which a match is currently sought. Pointer 405 is retained in a memory, such as a buffer memory. In some embodiments, pointer 405 is retained in memory associated with field 325, in other embodiments with context array 330 and in yet other embodiments in memory associated with both field 325 and context array 330. Because "Hostname FOO" has no preceding spaces, it is determined to be either a top-level submode or a top-level command. Therefore, "Hostname FOO" is written in line 335 of context array 330.

The line in field 325 is then compared to the first line of file 310. Because the first line of file 310 is a command line, it is evaluated to determine whether it matches with the line of field 325. In this case, the first line of file 310 matches the line in field 325. "Hostname FOO" will be retained, for the time being, in line 335 of context array 330 because it may be the context name of the next command line.

Pointer 410 indicates the position of the last line in file 310 which matched, so pointer 410 is initially positioned just after the first line of file 310. According to other aspects of this method, pointer 410 is positioned adjacent to the last line of file 310 that matched. However, positioning pointer 410 just after the last line that matched is preferred, because this pointer indicates where in file 310 the method should continue looking for a match. In some preferred embodiments, one or more additional pointers are positioned to track where a search last took place in the previous submode level. That way, when a search is completed in a particular submode, there is an indication of where the last match occurred (or a last command was evaluated) in a parent submode level. Pointer 415 indicates the first command of the current submode level in file 310. The use of pointers 410 and 415 will be clarified in the following paragraphs. In some embodiments, pointers are retained in memory associated with field 325. In other embodiments, pointers are retained in memory associated with context array 330 and in yet other embodiments in memory associated with both field 325 and context array 330.

Figure 5:
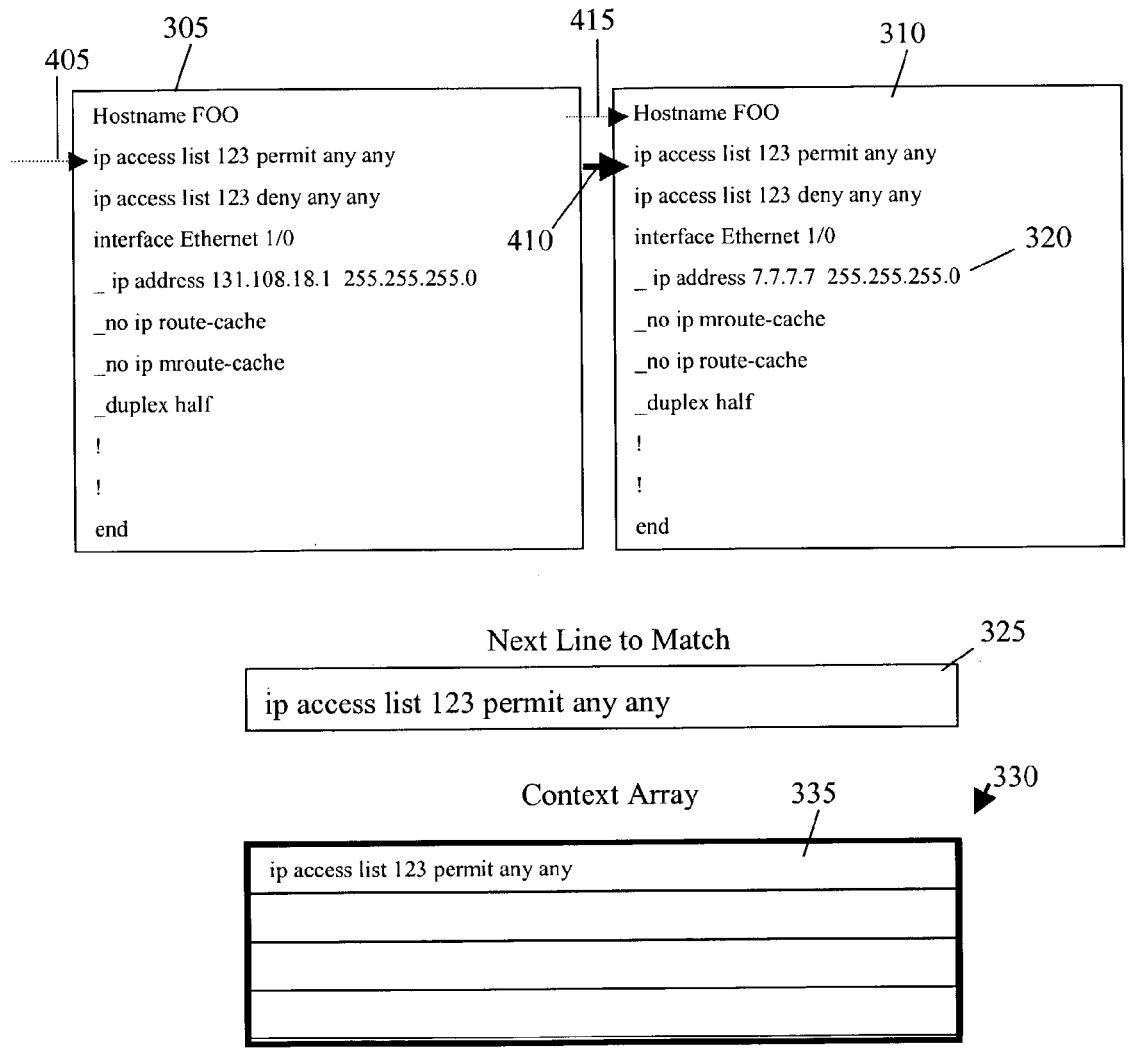
FIG. 5 illustrates two exemplary configuration files and a context array at a second time during a comparison of a first configuration file to a second configuration file.

After the first line of file 310 has been evaluated, pointer 410 is positioned below "Hostname FOO," as shown in FIG. 5. Lines above pointer 410 will not be evaluated (at least initially) to find a match with subsequent lines written in field 325. Accordingly, the use of pointers 410 and 415 decreases the number of lines in file 310 which must be evaluated, thereby allowing a more efficient operation of this method.

When the next command line of file 305 is evaluated, pointer 405 is moved down one line and this line ("ip access list 123 permit any any") is written in field 325, because it is a command line. Because "ip access list 123 permit any any" has no preceding spaces, it is also determined to be a top-level submode. Therefore, "ip access list 123 permit any any" is written in line 335 of context array 330. The next line below "Hostname FOO" in file 310 is evaluated to see if it matches the line in field 325. Because it matches, "ip access list 123 permit any any" remains in line 335 pending evaluation of the next line in file 305.

Figure 6:
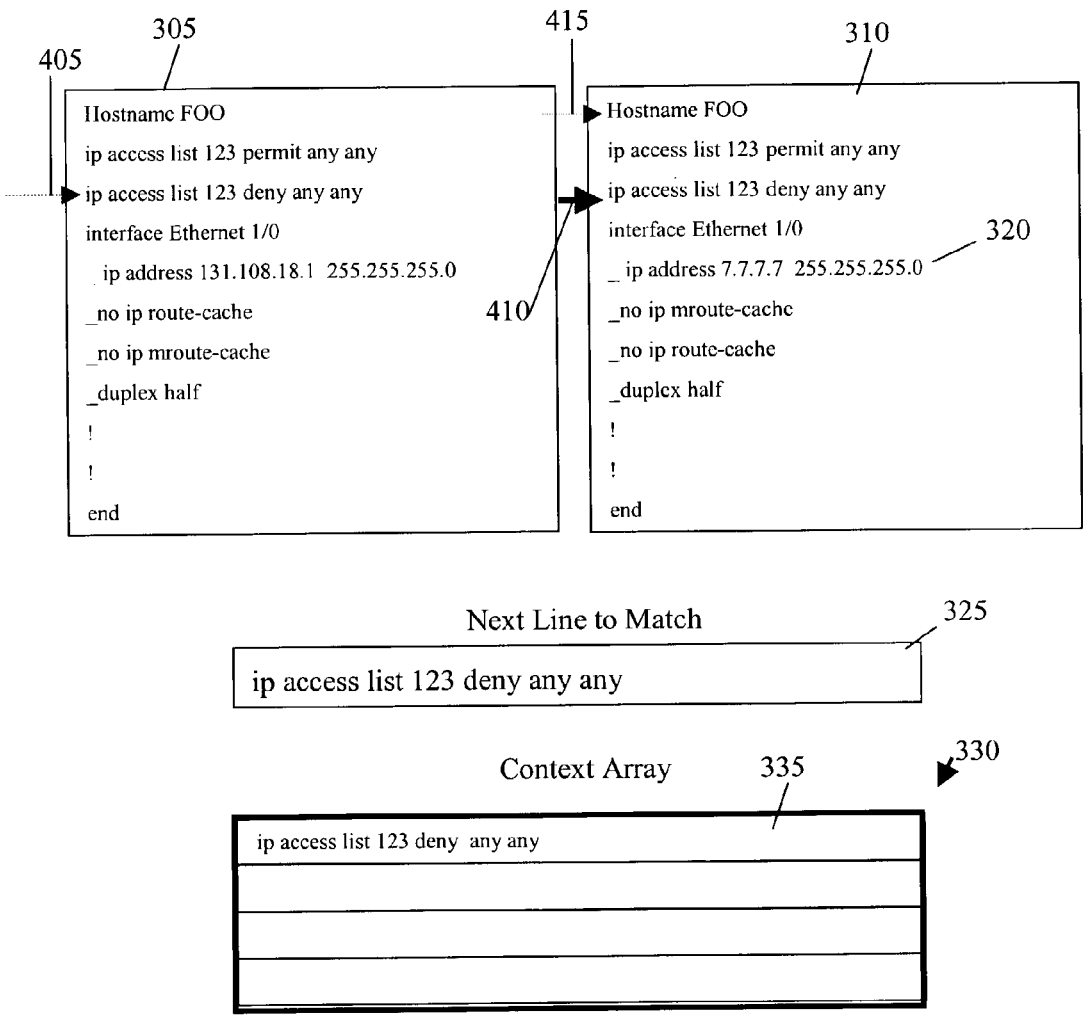
FIG. 6 illustrates two exemplary configuration files and a context array at a third time during a comparison of a first configuration file to a second configuration file.

Pointer 410 is moved to a position below "ip access list 123 permit any any" in file 310, as shown in FIG. 6. Pointer 405 is moved down one line and this line ("ip access list 123 deny any any") is evaluated to determine whether it is a command line and whether it includes an initial space. Because "ip access list 123 deny any any" is a command line, it is written in field 325. Because "ip access list 123 deny any any" contains the same number of initial spaces (i.e. zero spaces) as the last command in the context array, "ip access list 123 deny any any" is written in line 335. File 310 is searched, starting below pointer 410, to find a match for "ip access list 123 deny any any." The next line is a match, so "ip access list 123 deny any any" remains in line 335 pending evaluation of the next line in file 305.

Figure 7:
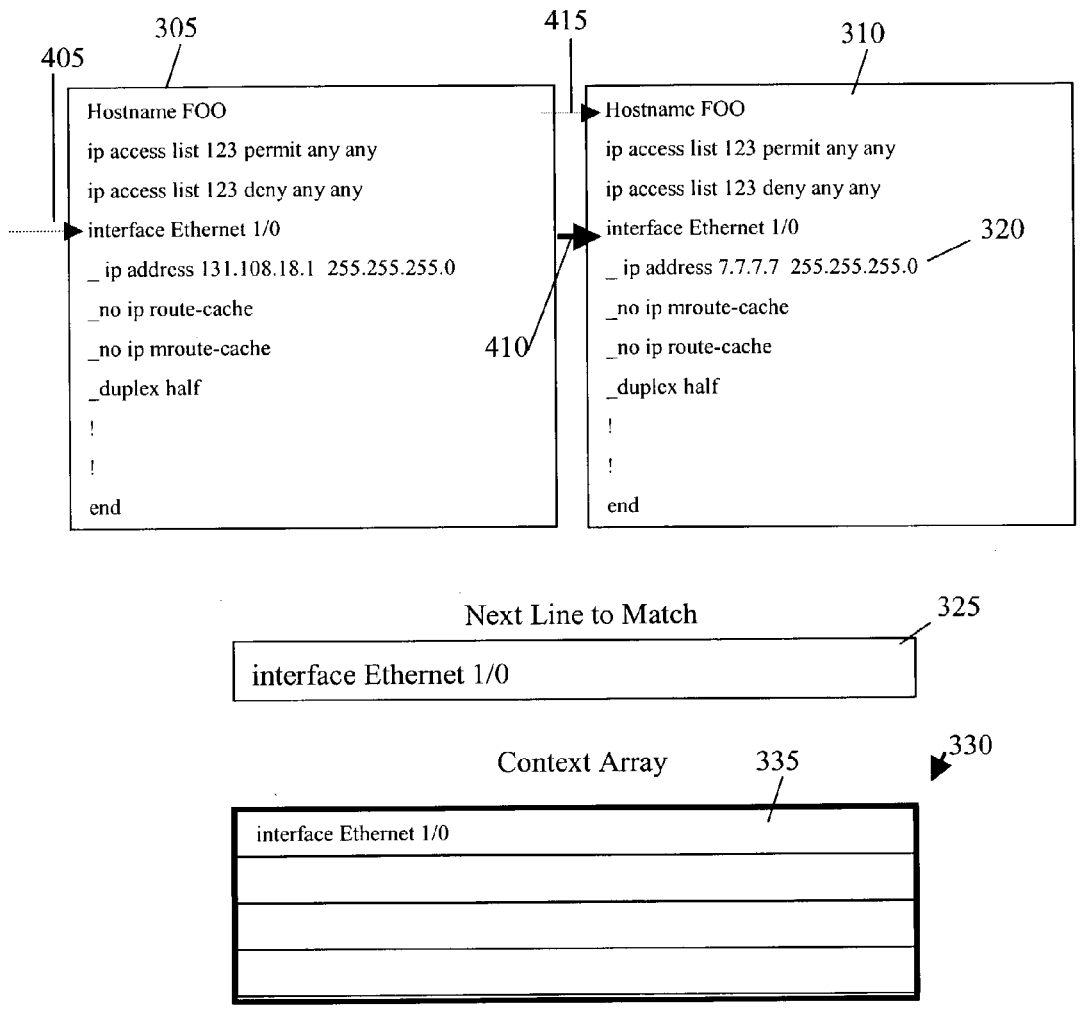
FIG. 7 illustrates two exemplary configuration files and a context array at a third time during a comparison of a first configuration file to a second configuration file.

Pointer 410 is moved to a position just below "ip access list 123 deny any any" in file 310, as shown in FIG. 7. Pointer 405 is moved down one line and this line ("interface Ethernet 1/0") is evaluated to determine whether it is a command line and whether it includes an initial space. Because "interface Ethernet 1/0" is a command line, it is written in field 325. Because "interface Ethernet 1/0" contains the same number of initial spaces (i.e. zero spaces) as the last command in the context array, "interface Ethernet 1/0" is written in line 335. File 310 is searched, starting below pointer 410, to find a match for "interface Ethernet 1/0." The next line is a match, so "interface Ethernet 1/0" remains in line 335 pending evaluation of the next line in file 305.

Figure 8:
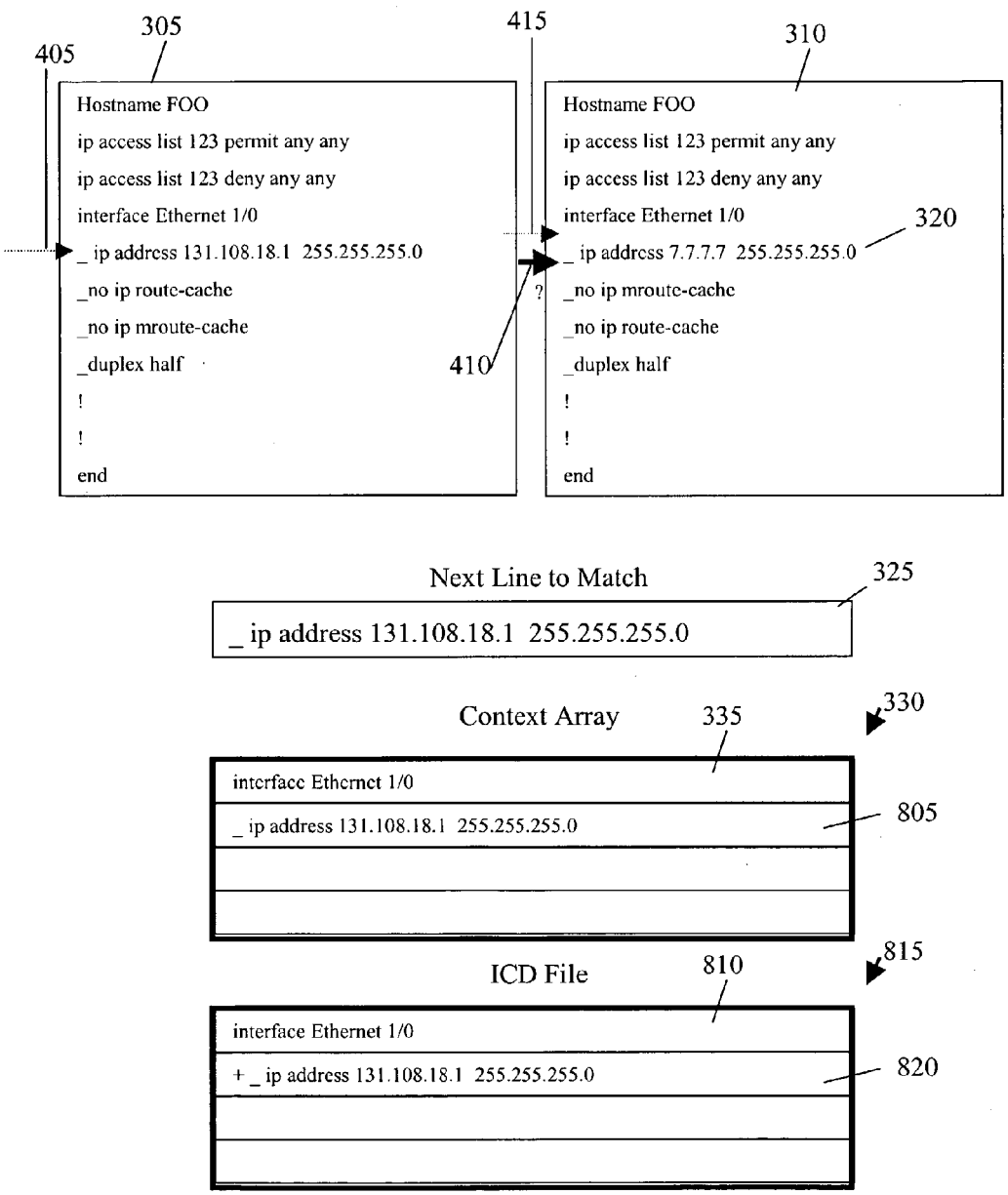
FIG. 8 illustrates two exemplary configuration files and a context array at a fifth time during a comparison of a second configuration file to a first configuration file.

Pointer 410 is moved to a position just below "interface Ethernet 1/0" in file 310, as shown in FIG. 8. Pointer 405 is moved down one line and this line ("_ip address 131.108.18.1 255.255.255.0") is evaluated to determine whether it is a command line and whether it includes an initial space. Because "_ip address 131.108.18.1 255.255.255.0" is a command line, it is written in field 325. Because "_ip address 131.108.18.1 255.255.255.0" does include an initial space, "_ip address 131.108.18.1 255.255.255.0" is determined to be a command or submode within the submode "interface Ethernet 1/0." Therefore, "_ip address 131.108.18.1 255.255.255.0" is written in line 805 of context array 330, below "interface Ethernet 1/0."

In addition, pointer 415 is moved to indicate the beginning of commands within the new submode "interface Ethernet 1/0." However, the former position of pointer 415 is retained in memory, at least temporarily.

File 310 is searched, starting below pointers 410 and 415, to find a match for "_ip address 131.108.18.1 255.255.255.0." However, in this case the next line of file 310 ("_ip address 7.7.7.7 255.255.255.0") is not a match. Therefore, successive lines of file 310 are queried as a match is sought, as indicated by the question mark to the left of "_no ip route-cache" in FIG. 8. As before, the first determination is whether each line is a command line. If a line is a command line, the next determination is whether the line has one initial space: if the line does not have an initial space, it is not in the same submode as "_ip address 131.108.18.1 255.255.255.0." Only after making these preliminary determinations is the line of file 310 compared to the current contents of field 325 (here, "_ip address 131.108.18.1 255.255.255.0") to see if there is a match.

The lines "no ip mroute-cache," "no ip route-cache" and "duplex half" are investigated and it is determined that there is no match. The following lines of file 310 begin with an exclamation point, so these lines are skipped. The next line, "end," is a command line, but it does not have a preceding space. Therefore, it is determined that the "end" command is not within the same submode as the line currently stored in field 325. Accordingly, the algorithm returns to pointer 415, which marks the beginning of this submode, and determines whether all lines of this submode have been investigated to search for a match.

Since there is no match in the submode, "_ip address 131.108.18.1 255.255.255.0" is written in line 820 of intelligent config diff ("ICD") file 815. In order to preserve the hierarchical context of this command line, in preferred aspects of the invention, the corresponding top-level submode command "interface Ethernet 1/0" is written in line 810 of ICD file 815. According to some aspects of the invention, "_ip address 131.108.18.1 255.255.255.0" has a plus sign in line 810, indicating that this line is present in file 305 but missing from file 310. This sign may be introduced by the comparison algorithm, in a post-processing routine, or in any convenient way. Similarly, if a line is present in file 310 but is not in file 305 (as determined in a positive pass of this method, which will be explained below), the line will begin with a minus sign. However, other aspects of the invention use the opposite sign convention.

Figure 9:
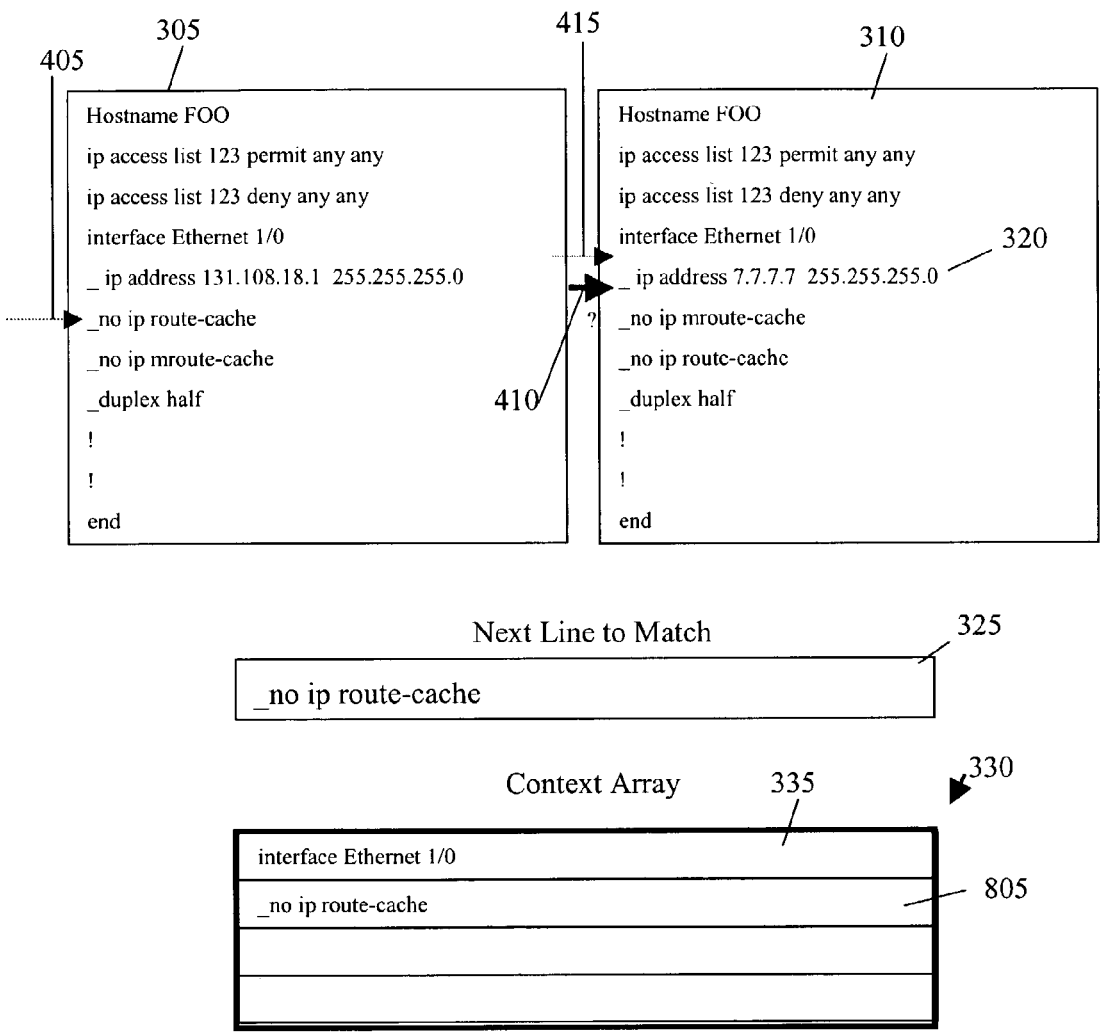
FIG. 9 illustrates two exemplary configuration files and a context array at a sixth time during a comparison of a second configuration file to a first configuration file.
Figure 10:
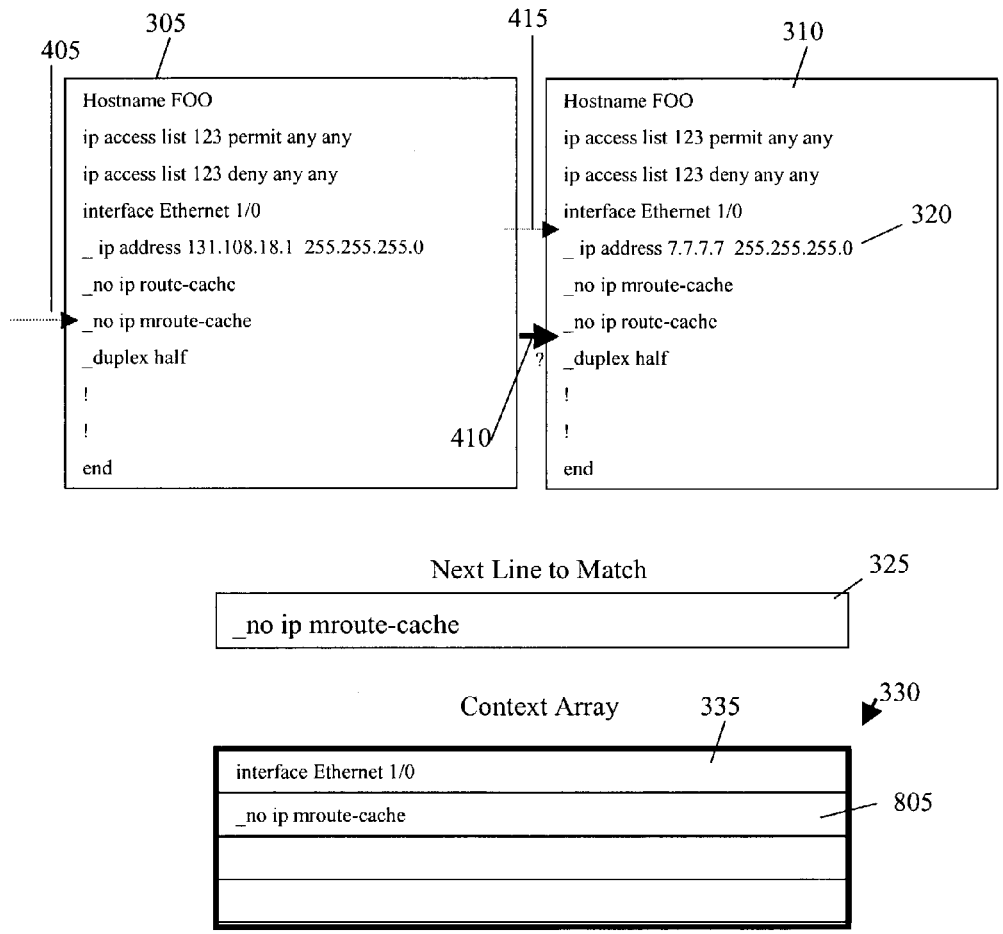
FIG. 10 illustrates two exemplary configuration files and a context array at a seventh time during a comparison of a second configuration file to a first configuration file.

The process then continues as before until all lines of file 305 are evaluated. As shown in FIG. 9, pointer 405 is advanced to the next line of file 305 and this line ("_no ip route-cache") is written into field 325 because it is a command line. Since "_no ip route-cache" includes a single space at the beginning of the line, it is determined to be at the same hierarchical level as "_ip address 131.108.18.1 255.255.255.0."Therefore, "_no ip route-cache" replaces "_ip address 131.108.18.1 255.255.255.0" in line 805 of context array 330.

File 310 is searched, starting below pointers 410 and 415, to find a match for "_no ip route-cache." Note that neither pointer moved during the search for the last entry in field 325: pointer 410 remained in the same position because there was no match and pointer 415 remained in the same position because the search is continuing in the same submode. Therefore, "_ip address 7.7.7.7 255.255.255.0" is evaluated first to determine whether it matches with "_no ip route-cache." It does not match, so the next line of file 310

("_no ip mroute-cache") is evaluated and determined not to match. The search proceeds to the next line of file 310, where a match is found. Pointer 410 advances to the line of 310 where a match is found (or alternatively, to a position just after the line where the match is found).

However, the line number of pointer 405 (line 6 of file 305) is different from the line number where the match is found (line 7 of file 310). In preferred aspects of the present invention, when a match is found in a part of the configuration file 310 that is above pointer 410, this difference is stored in a memory. (Comment lines and other non-command lines are not included in this determination.) This memory may be a memory associated with context array 330 or ICD file 815, or may be another memory location. According to some such aspects, if the same command occurs in a part of the configuration file 310 that is above pointer 410, it is determined whether re-ordering the command is significant. For example, a look-up table of order-sensitive commands (such as access control list commands) may be referenced to determine whether the command is in the table. If so, this fact is retained in memory. In some such aspects, the memory is associated with ICD file 815. If the command is not order-sensitive, the method proceeds, generally speaking, as if an ordinary match had been obtained. One exception will be explained in the following example.

In this instance the command is not order-sensitive, so the process continues as if a normal match had been found. As may be seen in FIG. 10, pointer 405 advances to the next line of file 305, which is "_no ip mroute-cache." Field 325 and line 805 of context array 330 are updated to read "_no ip route-cache." Pointer 410 moves to a position just past where the last match was found in file 310 and the search for "_no ip mroute-cache" begins at "_duplex half," the next line after pointer 410. This is not a match, so the search proceeds to the next line of file 310, which is skipped because it is a comment line. The next line is skipped for the same reason. The search continues to the last line of file 310, "end," which is not evaluated further because it lacks an initial space and therefore cannot be in the same submode as "_no ip mroute-cache."

Therefore, the search proceeds to "_ip address 7.7.7.7 255.255.255.0," the line just after pointer 415. This is not a match, so the search proceeds to the following line and a match is obtained. As with the previous match, however, the matching lines are in different positions of files 305 and 310. Therefore, "_no ip mroute-cache" is evaluated to determine whether it is an order-sensitive command. Because it is not an order-sensitive command, this is treated as an ordinary match, with one exception: according to some aspects of the invention, pointer 410 does not move because the matched line occurs prior to (above) the last matched line.

Figure 11:
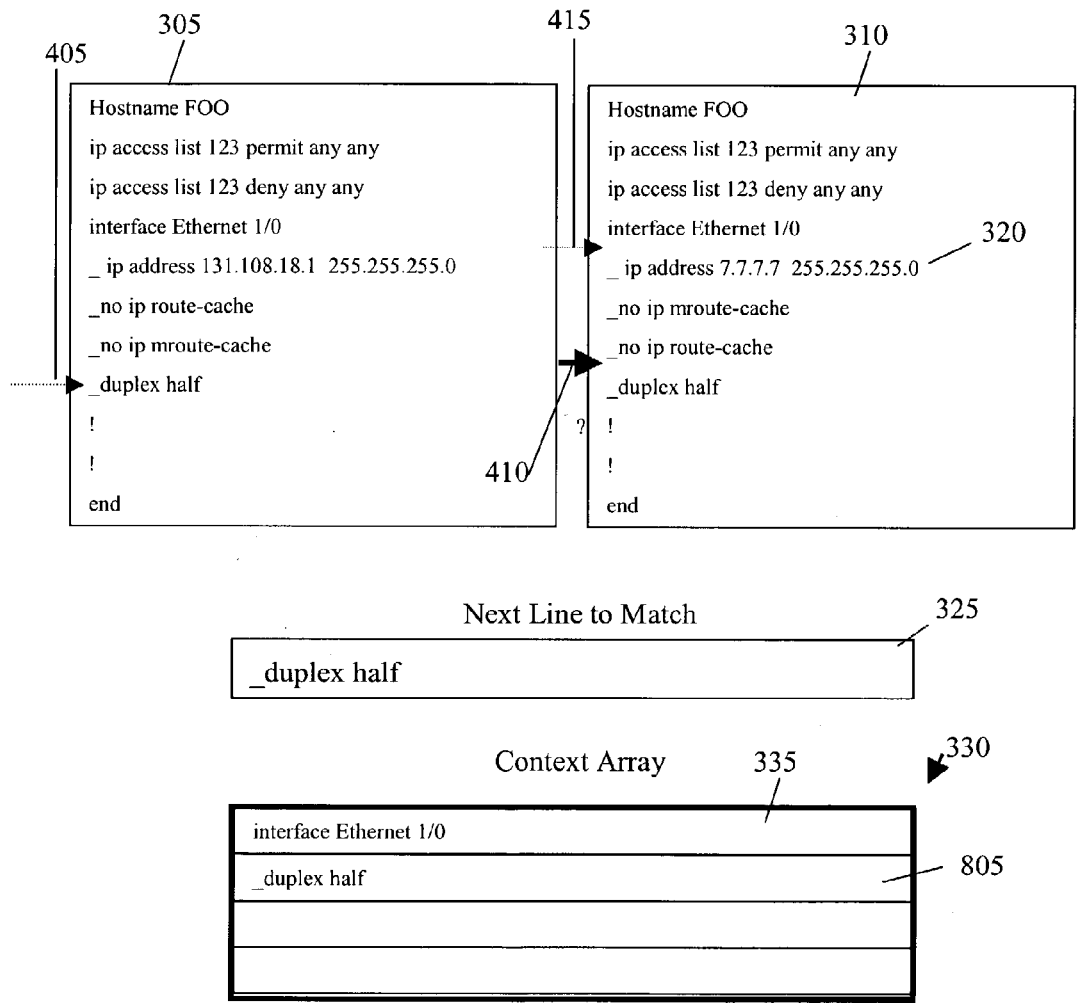
FIG. 11 illustrates two exemplary configuration files and a context array at a eighth time during a comparison of a second configuration file to a first configuration file.

As illustrated in FIG. 11, pointer 405 advances to the next line of file 305, which is "_duplex half." This is a bona fide command, so "_duplex half" is written in field 325. Because "_duplex half" includes an initial space, it is also written in line 805 of context array 330. The next phase of searching will begin with the line following pointer 410 in file 310, which is a match.

Pointer 405 then advances to the next line of file 305, which is skipped because it is a comment line. Pointer 405 advances to the following line of file 305, which is skipped for the same reason.

Figure 12:
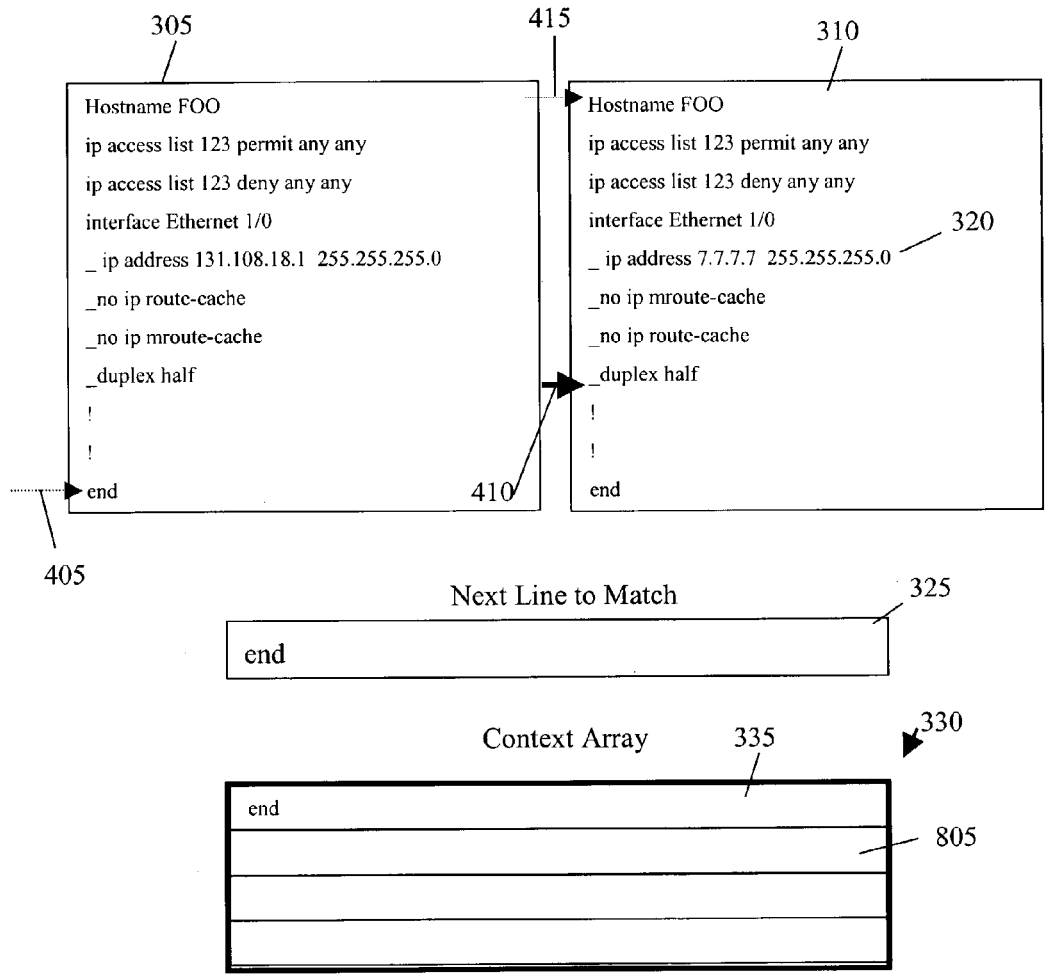
FIG. 12 illustrates two exemplary configuration files and a context array at a ninth time during a comparison of a second configuration file to a first configuration file.

As shown in FIG. 12, pointer 405 then goes to the next line of file 305, "end."This is a bona fide command, so "end" is written in field 325. Because "end" does not include an initial space, "end" is not at the same submode level as the preceding commands of file 305. Accordingly, line 805 of context array 330 is cleared and "end" is written in line 335. In addition, pointer 415 moves to the beginning of file 310, because that is the location of the first command at the same submode level as the entry in field 325 (no preceding spaces).

The next phase of searching will begin with the first line of file 310 following pointer 410, which is skipped because it is a comment line. The next line is a comment line and is also skipped. The following line has the same number of preceding spaces (none) as the current entry of field 325, so it is evaluated to determine whether it is a match, which it is. Because there are no more entries of file 305 for which a match is sought, the negative pass ends. Depending on the process for which the foregoing method is performed, the contents of ICD file 815 (and any other relevant data) may be output at this time.

According to preferred embodiments of the invention wherein a copy of pointer 410 is retained for every submode and for the top level, the search for a match to the "end" command of file 105 would be slightly different. The pointer for the submode "interface Ethernet 1/0" would be deleted and replaced with the saved pointer for the top level. This pointer points to the line following "interface Ethernet 1/0" because that was the last successful match at the top level. The subroutine is trying to match "end" which has zero preceding spaces, so lines in the submode "interface Ethernet1/0" that have preceding spaces are skipped. Comment lines are also skipped. Finally, the process reaches a line at the top level that we can compare: this is the command "end" in file 310, which is a match.

In a "positive" pass, each command line of file 310, in turn, is compared to the commands of file 305, in the manner described above. The command of file 310 for which a match is currently sought is indicated by pointer 405 and entered in field 325. Pointers 410 and 415 are used as described above, except that these pointers are used in file 305 instead of file 310. As noted above, the positive pass identifies those commands which are in file 310 but are not in file 305.

As previously discussed, "_ip address 7.7.7.7 255.255.255.0" is in file 310 but is not in file 305. Therefore, the result of a positive pass with the foregoing exemplary files 305 and 310 is that ICD file 815 will have "−_ip address 7.7.7.7 255.255.255.0" in one of lines 820. Line 810 indicates that the context of line 815 is top-level command "interface Ethernet 1/0." In this example, the contents of ICD file 815 are output after the negative and positive passes are complete.

Figure 13:
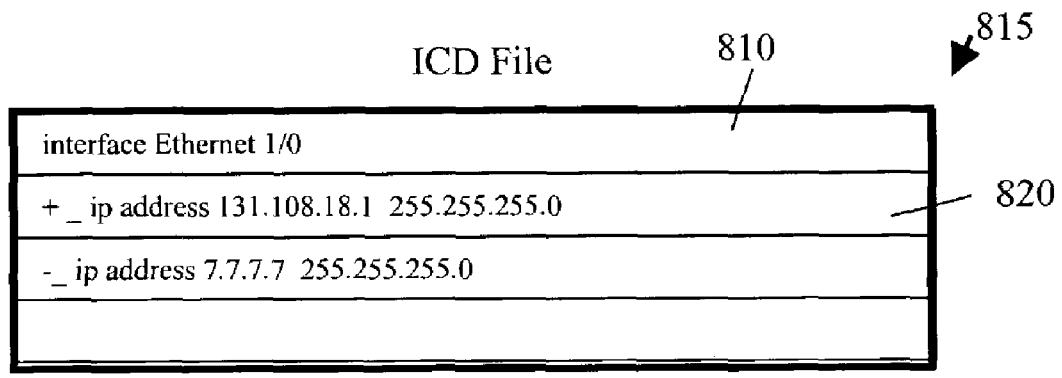
FIG. 13 depicts an exemplary output resulting from the foregoing comparisons.

FIG. 13 depicts the contents of ICD file 815 at this time. However, the format of ICD file 815 shown in FIG. 13 is merely illustrative; numerous other formats are within the scope of the present invention. For example, according to other aspects of the invention, ICD file 815 has the following format:

Interface Ethernet 1/0
+_ip address 131.108.18.1 255.255.255.0
Interface Ethernet 1/0
−_ip address 7.7.7.7 255.255.255.0

The foregoing process results in an output which is in a "programmatic" format, meaning that ICD file 815 may be used as an input file to a program for changing configuration states. For example, ICD file 815 may be used as input to a "rollback" operation, wherein a device's configuration state at a second time is returned to the device's previous configuration state at a first time. In a rollback operation, commands of the second configuration state that have been added since the first time ("added commands") must be deleted. Moreover, commands of the first configuration state that have been deleted by the second time ("deleted commands" or "missing commands") must be added. In preferred aspects of the invention, added commands are deleted before deleted commands are added. According to some aspects of the invention, the diffing and rollback operations are performed as one continuous process, with the output of an automated diffing operation being input to an automated rollback operation.

Figure 14A:
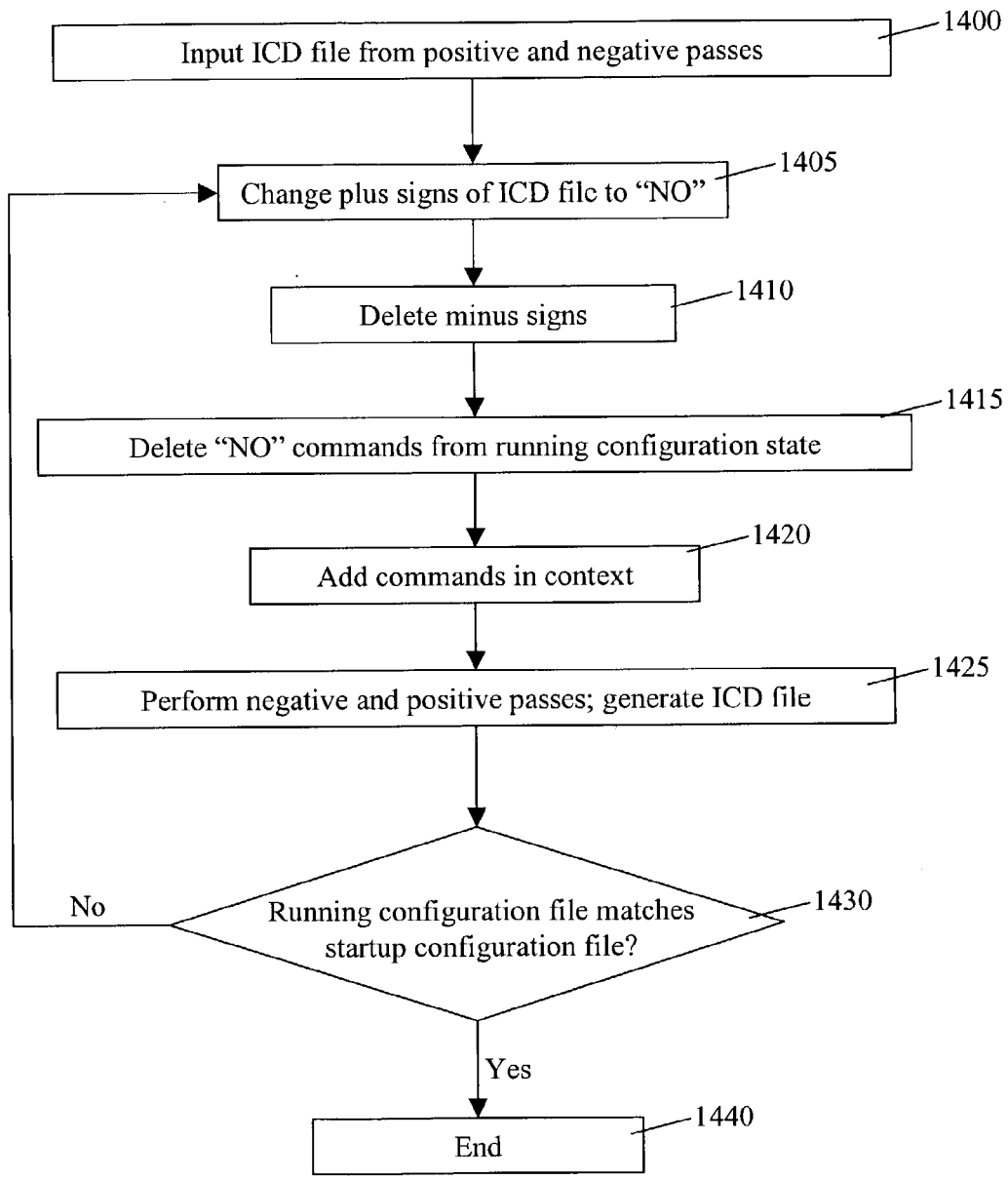
FIG. 14A is a flow chart that outlines the steps of a rollback operation according to some aspects of the invention.

FIG. 14A is a flow chart that outlines a rollback operation according to some aspects of the present invention. In this example, a configuration state of a network device, as indicated by a running configuration file, is being rolled back to a desired configuration state. The desired configuration state may be, for example, the state of a startup configuration file. Note that some network devices do not continuously update the running configuration file to reflect the current configuration state of a device, but instead generate a "snapshot" of the configuration state in response to a request.

In step 1400, an ICD file is input after both a negative and a positive pass have been performed, comparing the running configuration file and the startup configuration file with one another. In preferred aspects of the invention, the ICD file is used as direct input to a machine-level interface (e.g., to software installed on a router or a host device). In step 1405, plus signs associated with commands in the ICD file (from the result of the negative pass) are replaced with equivalent commands that undo them. For example, replacing the '+' sign with a "no" command generates the equivalent undo command in many instances. If the command following the '+' sign begins with a 'no,' however, the '+' is replaced with the word 'default'—the rest of the command remains as is. The above two steps work for a majority of commands. Occasionally, a command requires different undo commands—in such cases, these commands are stored in a lookup table along with their undo commands. In step 1410, minus signs associated with commands in the ICD file (from the result of the positive pass) are removed.

In step 1415, "NO" commands are deleted from the proper context of the network device's configuration state, according to the hierarchical context information in the ICD file. Similarly, in step 1420, the commands that had minus signs removed in step 1410 are added to the proper context of the network device's configuration state, once again according to the hierarchical context information in the ICD file.

After such changes have been applied, preferred aspects of the invention perform another ICD diff operation in step 1425, including a negative pass and a positive pass. Some network devices will need to generate another running configuration file to provide a "snapshot" of the new configuration state of the network device. The ICD diff operation in step 1425 is performed with respect to the new running configuration file and the desired or "target" file, which is a startup configuration file in this example.

This step allows a comparison in step 1430 of the modified configuration state (after the rollback has been applied) with the desired configuration file. If there are no differences, the operation stops in step 1440. If there are still differences, the process continues to step 1405 and the rollback operation is applied again. In preferred aspects of the invention, a limit is placed on the number of times that the process will loop back to step 1405 if the running configuration file is not found to match the startup configuration file in step 1430.

Preferred aspects of the invention can handle problems which would otherwise be caused by adding certain commands to the running configuration file. For example, ACL commands, keepalive commands and boot commands can all cause problems. Suppose that a "no keepalive" command has been added to the running configuration file. The output of the negative pass would be "+ no keepalive," which would become "no no keepalive" in the absence of special rules for dealing with this issue.

According to a special rule, the rollback algorithm changes "+ no keepalive" in the ICD file to "default keepalive." (The default value for the keepalive command is "keepalive 10," which means send a dummy packet every 10 seconds to keep the line alive or open.) When an ICD is performed, "+ no keepalive" is added to the ICD file. The rollback algorithm converts this into "default keepalive" when applying it to the running configuration.

Sometimes, a system administrator is only concerned about adding new commands to a configuration state. For example, if new lines are added to a startup configuration file, it may be desirable to simply add these new lines to the running configuration state without otherwise comparing the startup configuration file and the running configuration file that reflects this running configuration state. An "incremental diff" algorithm may be used for this purpose. One benefit of incremental diff is to add only new lines, without adding commands that already exist in a running configuration.

Figure 14B:
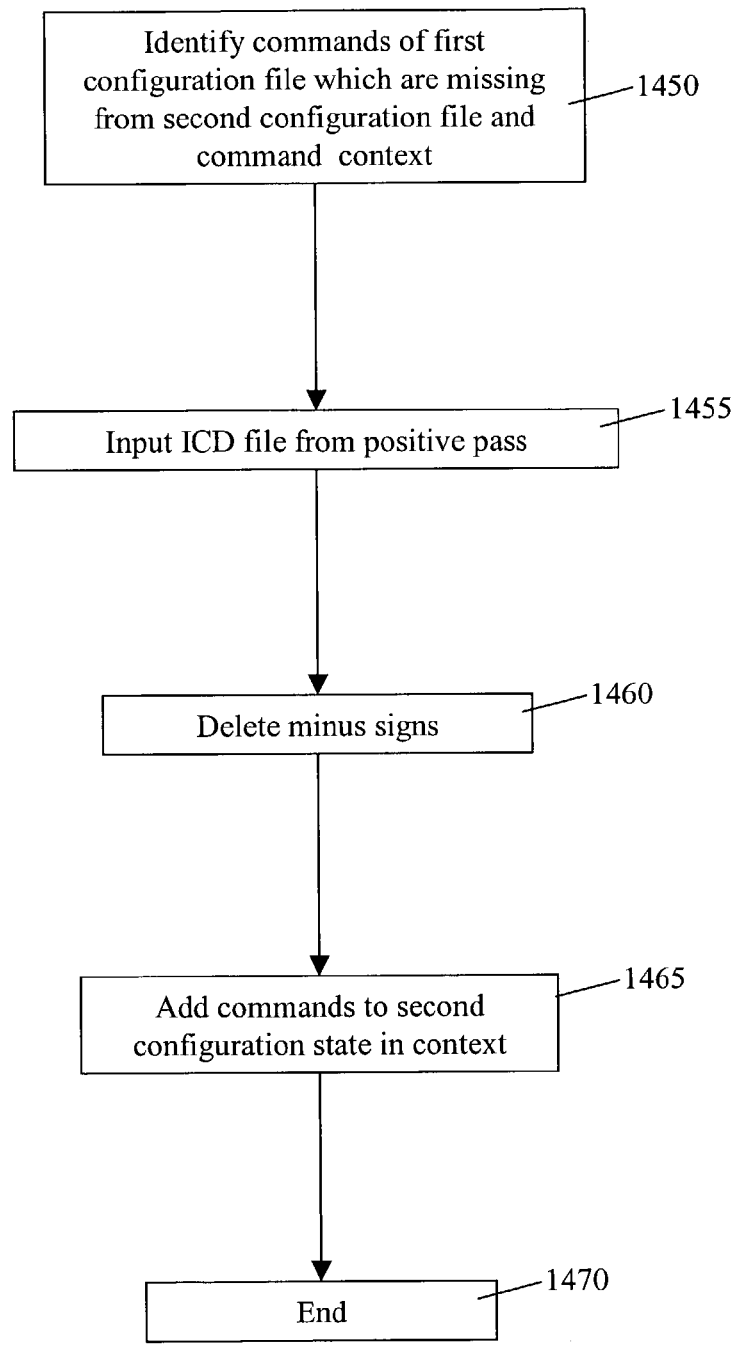
FIG. 14B is a flow chart that outlines the steps of an incremental diff operation according to some aspects of the invention.

An incremental diff algorithm according to some aspects of the present invention will now be described with reference to FIG. 14B. In step 1450, a positive comparison is made: commands of a first configuration file which are missing from a second configuration file are identified and stored with their hierarchical context, as described above. In this example, the first configuration file is a startup configuration file to which new lines have been added and the second configuration file is a running configuration file. The incremental diff process requires only the output of a positive pass, because the only commands of interest are those which appear in the startup configuration file but not in the running configuration file. Therefore, the ICD file generated from the positive pass of step 1450 is directly input to an incremental diff algorithm in step 1455.

As described above, according to some aspects of the invention, the output of a positive pass has a minus sign in the ICD file. According to some such aspects of the invention, these minus signs are deleted in step 1460 prior to the application of these commands to the running configuration state in step 1465. In step 1470, the process ends. According to other aspects of the invention, no minus sign is associated with "missing" commands that are identified in the positive pass in step 1450. These missing commands are simply applied to the running configuration state. As with the rollback operations described above, producing the ICD diff file may be part of the incremental diff process or it may be a separate, stand-alone process.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the methods of this invention may be implemented in specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 15:
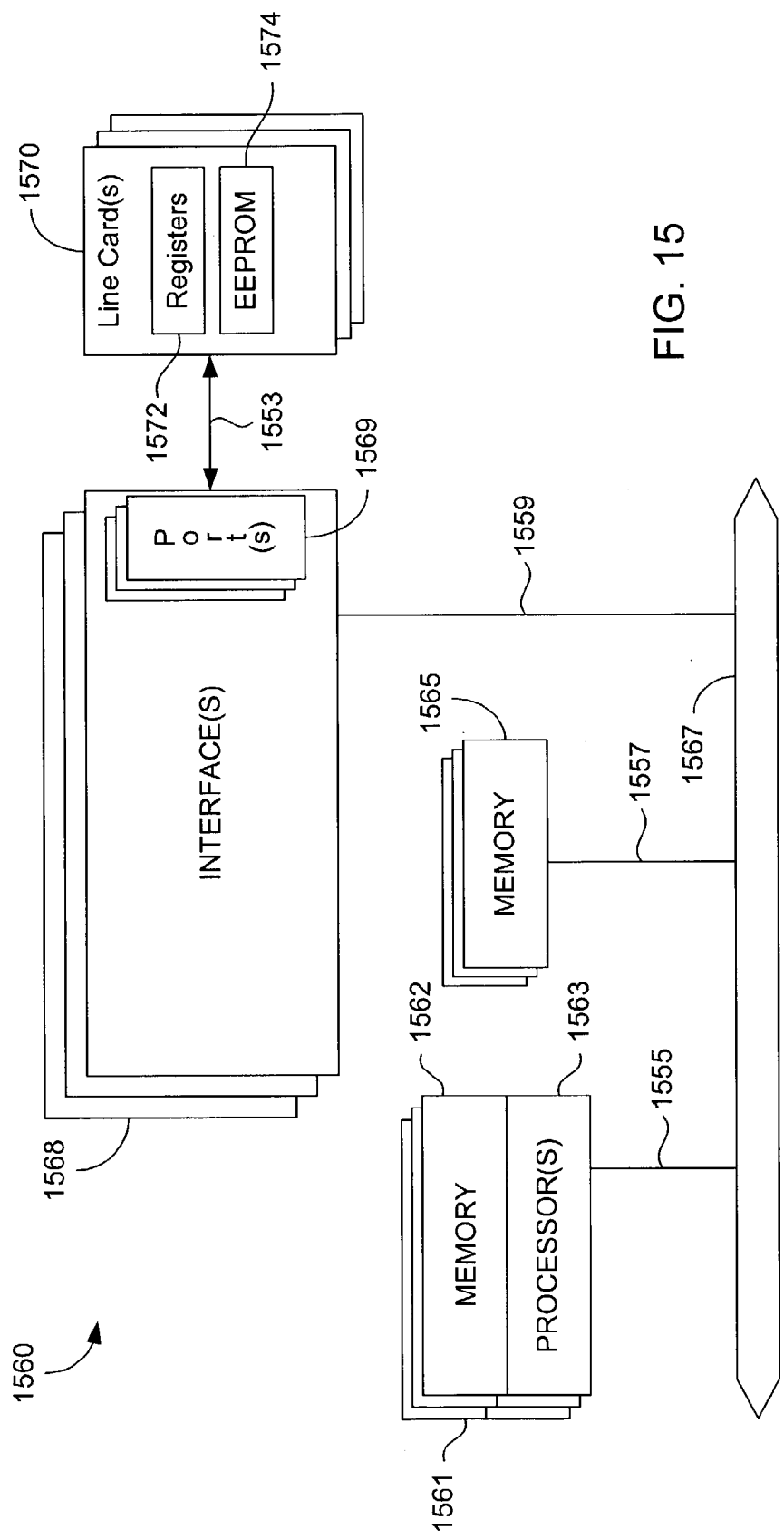
FIG. 15 depicts a network device that may be configured to perform various aspects of the invention.

Referring now to FIG. 15, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 15 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of the network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in transmission media such as a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For instance, it will be appreciated that at least a portion of the functions described herein that are performed by a network device such as a router, a switch and/or selected components thereof, may be implemented in another device. For example, these functions could be performed by a host device (e.g., a personal computer or workstation). Such a host could be operated, for example, by a network administrator.

In other alternative aspects of the present invention, certain commands will not be added to the running configuration state during the rollback or incremental diff process; instead, these commands will be suppressed. According to some such aspects, these commands are stored in a file (e.g., in a "suppress commands" buffer) that is compared to the ICD file generated by the diffing operation. For example, commands unknown to the parser (e.g., "FOO") may be suppressed. Considering these and other variations, the scope of the invention should be determined with reference to the appended claims.

We claim:

1. A computer-implemented method for modifying a second configuration state of a network device based on a first configuration state of the network device, the method comprising:

inputting a programmatic diff file produced by comparing a second configuration file representing the second configuration state of the network device to a first configuration file representing the first configuration state of a network device, wherein the inputting includes adding a symbol indicating that a command line has been added next to a command line contained in the second configuration file that is not contained in the first configuration file;

replacing the symbol indicating a command line has been added with a symbol indicating a command line should not be executed;

for occurrences in the programmatic diff file where two symbols indicating a command line should not be executed are assigned to the same command line, removing both symbols indicating the command line should not be executed; and modifying the second configuration state based upon commands in the programmatic diff file.

2. The method of claim 1, wherein the programmatic diff file comprises a plurality of commands in a hierarchical context.

3. The method of claim 1, wherein the first configuration file comprises a startup configuration file.

4. The method of claim 1, wherein the second configuration file comprises a running configuration file.

5. The method of claim 1, wherein the programmatic diff file comprises one or more commands that are in the first configuration file but not in the second configuration file.

6. The method of claim 2, wherein the executing step comprises modifying the second configuration state by adding commands to the second configuration state in positions defined by the hierarchical context.

7. The method of claim 2, wherein the hierarchical context is characterized by a plurality of submode levels.

8. The computer-implemented method of claim 1, wherein, for occurrences in the programmatic diff file where two symbols indicating a command line should not be executed are assigned to the same command line, the computer-implemented method further comprises: adding a default symbol to the command line.

9. The computer-implemented method of claim 1, wherein the symbol indicating that a command line has been added next to a command line contained in the second configuration file that is not contained in the first configuration file is a "+" symbol.

10. The computer-implemented method of claim 9, wherein the symbol indicating a command line should not be executed is a "no" symbol.

11. A method of rolling back a second configuration state of a network device to a first configuration state of the network device, the second configuration state being represented by second commands of a second configuration file and the first configuration state being represented by first commands of a first configuration file, the method comprising:

inputting a programmatic diff file produced by comparing a second configuration file representing the second configuration state of the network device to a first configuration file representing the first configuration state of a network device, wherein the inputting includes adding a symbol indicating that a command line has been added next to a command line contained in the second configuration file that is not contained in the first configuration file;

replacing the symbol indicating a command line has been added with a symbol indicating a command line should not be executed;

for occurrences in the programmatic diff file where two symbols indicating a command line should not be executed are assigned to the same command line, removing both symbols indicating the command line should not be executed; and conforming the second configuration state to the first configuration state based upon commands in the programmatic diff file.

12. The method of claim 11, wherein the programmatic diff file comprises a plurality of commands in a hierarchical context.

13. The method of claim 12, wherein the hierarchical context is characterized by a plurality of submode levels.

14. The method of claim 11, wherein the first configuration file comprises a startup configuration file.

15. The method of claim 11, wherein the second configuration file comprises a running configuration file.

16. The method of claim 11, wherein the programmatic diff file comprises one or more commands that are present in the first configuration file but are not present in the second configuration file.

17. The method of claim 11, wherein the programmatic diff file comprises one or more commands that are present in the second configuration file but are not present in the first configuration file.

18. The method of claim 11, wherein the executing step comprises adding commands to the second configuration state in positions defined by the hierarchical context.

19. The method of claim 11, wherein the executing step comprises deleting commands from the second configuration state in positions defined by the hierarchical context.

20. The method of claim 11, wherein, for occurrences in the programmatic diff file where two symbols indicating a command line should not be executed are assigned to the same command line, the method further comprises: adding a default symbol to the command line.

21. The method of claim 11, wherein the symbol indicating that a command line has been added next to a command line contained in the second configuration file that is not contained in the first configuration file is a "+" symbol.

22. The method of claim 21, wherein the symbol indicating a command line should not be executed is a "no" symbol.

23. A computer program embodied in a computer-readable storage medium for modifying a second configuration state of a network device based on a first configuration state of the network device, the computer program causing a computing device to perform the following steps:

inputting a programmatic diff file produced by comparing a second configuration file representing the second configuration state of the network device to a first configuration file representing the first configuration state of a network device, wherein the inputting includes adding a symbol indicating that a command line has been added next to a command line contained in the second configuration file that is not contained in the first configuration file;

replacing the symbol indicating a command line has been added with a symbol indicating a command line should not be executed;

for occurrences in the programmatic diff file where two symbols indicating a command line should not be executed are assigned to the same command line, removing both symbols indicating the command line should not be executed; and modifying the second configuration state based upon commands in the programmatic diff file.

24. The computer program of claim 23, wherein the programmatic diff file comprises a plurality of commands in a hierarchical context.

25. The computer program of claim 24, wherein the modifying step comprises modifying the second configuration state by adding commands to the second configuration state in positions defined by the hierarchical context.

26. The computer program of claim 24, wherein the hierarchical context is characterized by a plurality of sub-mode levels.

27. The computer program of claim 23, wherein the first configuration file comprises a startup configuration file.

28. The computer program of claim 23, wherein the second configuration file comprises a running configuration file.

29. The computer program of claim 23, wherein the programmatic diff file comprises one or more commands that are present in the first configuration file but are not present in the second configuration file.

30. The computer program of claim 23, wherein the programmatic diff file comprises one or more commands that are present in the second configuration file but are not present in the first configuration file.

31. The computer program of claim 23, wherein, for occurrences in the programmatic diff file where two symbols indicating a command line should not be executed are assigned to the same command line, the following step is also performed: adding a default symbol to the command line.

32. The computer program of claim 23, wherein the symbol indicating that a command line has been added next to a command line contained in the second configuration file that is not contained in the first configuration file is a "+" symbol.

33. The computer program of claim 32, wherein the symbol indicating a command line should not be executed is a "no" symbol.

34. An apparatus for modifying a second configuration state of a network device based on a first configuration state of the network device, the apparatus comprising:

means for inputting a programmatic diff file produced by comparing a second configuration file representing the second configuration state of the network device to a first configuration file representing the first configuration state of a network device, wherein the inputting includes adding a symbol indicating that a command line has been added next to a command line contained in the second configuration file that is not contained in the first configuration file;

means for replacing the symbol indicating a command line has been added with a symbol indicating a command line should not be executed;

means for, for occurrences in the programmatic diff file where two symbols indicating a command line should not be executed are assigned to the same command line, removing both symbols indicating the command line should not be executed; and means for modifying the second configuration state based upon commands in the programmatic diff file.

35. The apparatus of claim 34, wherein the programmatic diff file comprises a plurality of commands in a hierarchical context.

36. The apparatus of claim 34, further comprising means for, for occurrences in the programmatic diff file where two symbols indicating a command line should not be executed are assigned to the same command line, adding a default symbol to the command line.

37. The apparatus of claim 34, wherein the symbol indicating that a command line has been added next to a command line contained in the second configuration file that is not contained in the first configuration file is a "+" symbol.

38. The apparatus of claim 37, wherein the symbol indicating a command line should not be executed is a "no" symbol.

* * * * *